Patented Oct. 25, 1932

1,884,105

UNITED STATES PATENT OFFICE

HARRY C. MOORE, OF CHICAGO, ILLINOIS, ASSIGNOR TO ARMOUR FERTILIZER WORKS, OF CHICAGO, ILLINOIS, A CORPORATION OF NEW JERSEY

MANUFACTURE OF AMMONIUM SALTS

No Drawing.   Application filed October 17, 1929.   Serial No. 400,457.

The present invention pertains to or concerns a novel and improved process or method of producing or making ammonium salts, such for example, as ammonium phosphate, ammonium sulphate, ammonium nitrate, or the like, one of the main purposes or prime aims of the invention being the employment of liquid anhydrous ammonia in practicing the process to economical advantage.

By the new method one or more mineral acids is or are mixed with such liquid anhydrous ammonia, thereby producing in one operation either a single or double ammonium salt or mixed salts, or both, requiring little or no drying to make a merchantable product adapted for use in fertilizer mixtures, and in which the heat resulting from the neutralization of the acid or acids with the ammonia is usually sufficient or adequate to suitably dry the product, but, if such result does not occur in the manner stated, due to excess water in the acid, the salt may be dried by any appropriate means or fitting procedure.

In the claims appended to this specification the term "mixed salts" has been used in a generic sense to cover the case where a mechanical mixture of salts is formed or that wherein an actual double salt is produced, or both.

In accordance with the well-known old or customary present practice of making ammonium salts, mineral acids, such as phosphoric acid, sulphuric acid, or nitric acid, either singly, or in combination of two or more, is or are mixed, as the case may be, with ammonia, either in the form of aqua ammonia or ammonia gas, and the ammonium salt or salts formed by the chemical reaction are recovered either by evaporation of the solution or by an applicable or convenient saturation procedure in which the salt separates from the solution and is obtained by drying in a centrifugal separating apparatus.

The weaknesses and defects of such common methods reside at least in part in the expense involved in effecting the evaporation or in the other courses followed for obtaining the salt after its production, and, where the ammonia supply is in the form of liquid anhydrous ammonia, the initial or preliminary conversion of such into aqua or gaseous ammonia by the application of heat is costly, as is also the subsequent evaporation.

I have discovered that by employing suitable apparatus and by using a rather concentrated acid, as, for example, 60° Beaumé sulphuric acid, and by mixing with liquid anhydrous ammonia, the ensuing product, due to the evaporation of the water by the heat of neutralization, while moist, contains sufficient sensible heat, however, to evaporate additional water during storage, resulting in a salt dry enough to be used in fertilizer manufacture.

In the case of some acid, containing excess water, and ammonia mixtures, when the product formed is not amply or fully dry, final drying may be accomplished or resorted to in a direct heat dryer or by other proper means.

In making ammonium salts by the new method, I prefer to start with a salt of the same grade or kind as that finally desired, as, for instance, to make ammonium sulphate, I select or choose to begin with ammonium sulphate previously produced, taking for example, one thousand (1000 lbs.) pounds of this, adding approximately 300 to 400 pounds of sulphuric acid of 55° to 60° Beaumé, and then adding to such mixture liquid anhydrous ammonia in such quantity that the resulting product will be practically neutral, or, if preferred, the liquid ammonia and sulphuric acid may be run into the container at the same time.

The reason for, or purpose of, employing the initial ammonium sulphate previously or already made is in order to provide a reacting surface medium which will permit ready and intimate mixing or association of the acid and ammonia, both in liquid form, and to prevent material loss of ammonia gas, as well as to enable one to more easily control the reaction.

Practice of this new and improved process requires no special apparatus and the method may be performed wholly satisfactorily in a standard fertilizer batch mixer.

Other solid, contact materials may be used, instead of having the same composition as the final product, if this, for any reason, may be desired, and, in fact, in some instances, it may be feasible to use some inert or refractory material, such as sand, or the mixer itself, in some cases, may be employed as the contact medium.

By using a plurality of acids, double or mixed ammonium salts or both may be made in practically the same way.

One of the principal or main economical advantages accruing from the practice of the new process is the use of the liquid anhydrous ammonia direct without preliminary conversion into gas and the lack of necessity of evaporation by heat of the final product.

The resulting salts are suitable, after cooling and pulverizing, for use in making fertilizer mixtures or for sale as such for fertilizing or other purposes. Salts prepared by this invention contain no more free acid or free ammonia than ordinary commercial fertilizer salts.

The invention as presented and defined in the appended claims is not limited to the precise procedure outlined and reasonable changes or latitude may be made in the exercise of the process without departure from the underlying principles of the invention and without the sacrifice of any of its material advantages.

I claim:

1. The process of making an ammonium salt, consisting in bringing the required acid in liquid form spread over an initial body of like salt acting as a contact medium, which does not participate in the chemical reaction, into contact with liquid anhydrous ammonia, the acid and ammonia being in such proportions that the salt formed contains practically no free acid or free ammonia.

2. The process of making an ammonium salt, consisting in bringing the required acid in liquid form spread over an initial body of like salt acting as a contact medium, which does not participate in the chemical reaction, into contact with liquid anhydrous ammonia, the acid and ammonia being in such proportions that the salt formed contains practically no free acid or free ammonia, the heat of the chemical reaction being sufficient of itself to evaporate most of the water of the acid employed and to produce a commercially dry product.

3. The process of making ammonium sulphate, consisting in bringing sulphuric acid spread over an initial body of ammonium sulphate acting as a contact medium, which does not participate in the chemical reaction, into contact with liquid anhydrous ammonia, the acid and ammonia being in such proportions that the salt formed contains practically no free acid or free ammonia.

4. The process of making ammonium sulphate, consisting in bringing sulphuric acid spread over an initial body of ammonium sulphate acting as a contact medium, which does not participate in the chemical reaction, into contact with liquid anhydrous ammonia, the acid and ammonia being in such proportions that the salt formed contains practically no free acid or free ammonia, the heat of the chemical reaction being sufficient of itself to evaporate most of the water of the sulphuric acid employed and to produce a commercially dry product.

In witness whereof I have hereunto set my hand and seal.

HARRY C. MOORE.